(12) United States Patent
Hirose et al.

(10) Patent No.: US 6,390,683 B1
(45) Date of Patent: May 21, 2002

(54) HEAT INSULATION SLEEVE AND BEARING DEVICE FOR FIXING ROLLER

(75) Inventors: Kazuo Hirose; Satoru Fukuzawa, both of Mie-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/587,725

(22) Filed: Jun. 5, 2000

(30) Foreign Application Priority Data

| Jun. 11, 1999 | (JP) | 11-164711 |
| Jul. 15, 1999 | (JP) | 11-201310 |
| Aug. 12, 1999 | (JP) | 11-228786 |
| Nov. 4, 1999 | (JP) | 11-314343 |

(51) Int. Cl.⁷ .............................................. F16C 19/50
(52) U.S. Cl. ........................ 384/476; 384/277; 384/905
(58) Field of Search .................... 384/476, 905, 384/536, 582, 277; 219/216, 388

(56) References Cited

U.S. PATENT DOCUMENTS

| 4,063,066 A | * 12/1977 | Nagoshi ..................... 219/216 |
| 4,813,372 A | * 3/1989 | Kogure et al. .......... 219/216 X |
| 4,852,230 A | * 8/1989 | Yu .......................... 384/536 X |
| 5,059,041 A | * 10/1991 | Watanabe et al. ............ 384/476 |
| 5,125,755 A | * 6/1992 | Adler et al. ................. 384/536 |
| 5,375,933 A | * 12/1994 | Mizutani et al. ............ 384/476 |
| 5,659,848 A | * 8/1997 | Jeon ........................... 384/275 |
| 6,030,128 A | * 2/2000 | Pontzer ....................... 384/476 |
| 6,044,723 A | * 4/2000 | Eda et al. ............... 384/536 X |

FOREIGN PATENT DOCUMENTS

JP          9184513          7/1997

* cited by examiner

*Primary Examiner*—Thomas R. Hannon
(74) *Attorney, Agent, or Firm*—Fulbright & Jaworski, L.L.P.

(57) ABSTRACT

A heat insulation sleeve and a bearing device using the heat insulation sleeve capable of reducing generation of periodical or sudden noises generated in the periphery of a fixing device are described. A flange of the heat insulation sleeve does not break to be used for a fixing roller incorporated in an energy-saving type electrophotographic apparatus such as a laser beam printer or the like which is heated and cooled frequently at short intervals. Both ends of the slit overlap each other in an axial direction of the heat insulation sleeve. And the heat insulation sleeve has a projection formed at a peripheral end opposite to a flange-disposed side. The heat insulation sleeve is press-fitted on an inner ring of a rolling bearing.

12 Claims, 7 Drawing Sheets

Fig. 1A
Fig. 1B
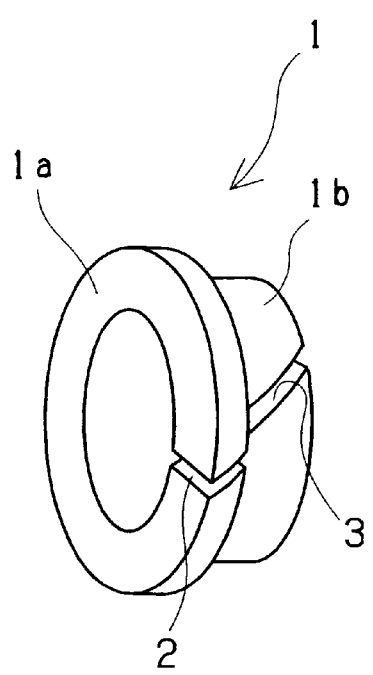
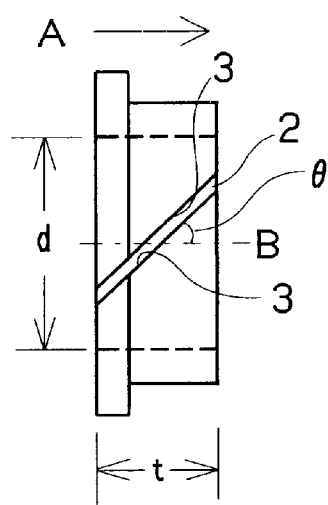

Fig. 5
Fig. 6
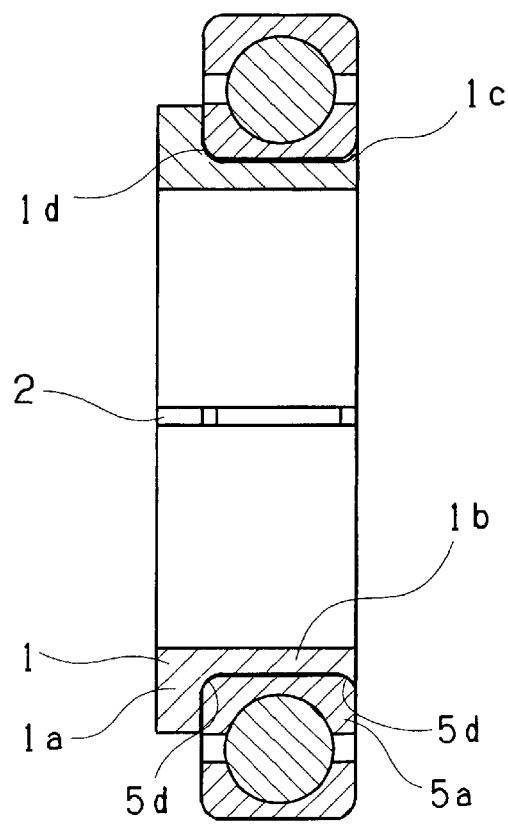
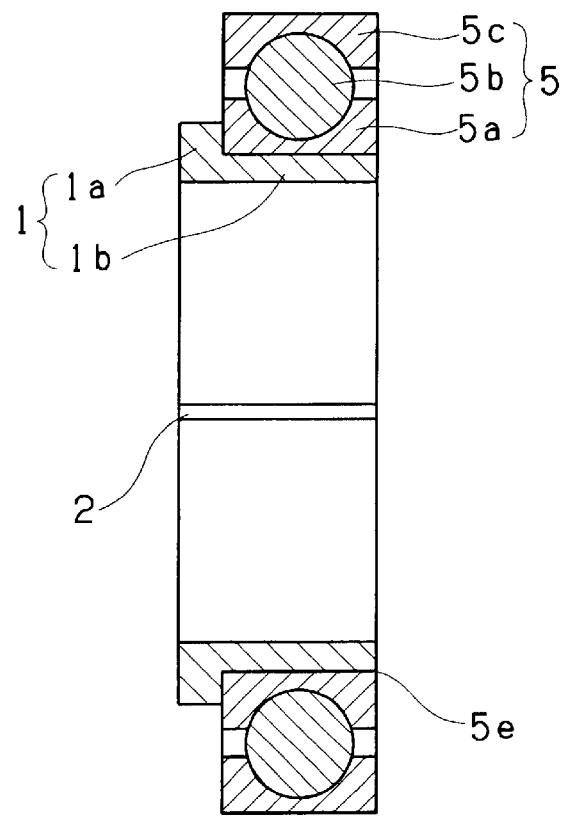

HEAT INSULATION SLEEVE AND BEARING DEVICE FOR FIXING ROLLER

BACKGROUND OF THE INVENTION

The present invention relates to a heat insulation sleeve for use in a copying machine, an electrophotographic apparatus such as a laser beam printer or the like, and a bearing device for use in a fixing roller using the heat insulation sleeve.

In the electrophotographic apparatus, toner is attached to an electrostatic latent image formed by an optical means, and then a toner image is transferred and fixed to a copy sheet. In the fixing stage, the toner image is passed between a fixing roller incorporating a heater and a press roller.

Thereby, a transferred toner image is fused and fixed to the copy sheet.

FIG. 7 shows an example of a heating-fixing device of the electrophotographic apparatus.

A fixing roller 4 is made of a soft metal and incorporates a linear or bar-shaped heater 6 at the center of its shaft. The fixing roller 4 has a cylindrical projected small-diameter shaft portion 4a at each end thereof. The fixing roller 4 is formed of a metal material such as aluminum or an aluminum alloy (A5056, A6063) superior in thermal conductivity. Turning or polishing finishes the surface of the cylindrical surface of the fixing roller 4. The surface of the metal material is coated with resin such as fluorine plastics having a high degree of unadhesiveness. The fixing roller 4 is rotatably supported by a housing 7 at the small-diameter shaft portion 4a through a rolling bearing 5 such as a deep-groove ball bearing. The heating-fixing device has a gear 8, receiving a rotational force, provided at an end side thereof outward from the rolling bearing 5.

The heating-fixing device has a press roller 9 in contact and parallel with the fixing roller 4. The press roller 9 is rotatably supported at each end thereof by the housing 7 through a bearing 10. The press roller 9 is composed of a core metal such as iron, aluminum or the like coated with silicon rubber or composed of a core metal and a linear or bar-shaped heater 6 incorporated at the center of its shaft. A rolling bearing at each end thereof supports the press roller 9.

While the copy sheet is being fed between the rotating fixing roller 4 and the press roller 9 that follows the rotation of the fixing roller 4, a toner image is fixed to the copy sheet by fusing the toner to the copy sheet with the fixing roller 4.

A heat insulation sleeve 1 made of a material such as synthetic resin or ceramics having a low thermal conductivity is installed for heat release between the rolling bearing 5 and the small-diameter shaft portion 4a of the fixing roller 4.

With reference to FIG. 8 showing a conventional heat insulation sleeve, the heat insulation sleeve 1 is described below. The heat insulation sleeve 1 has a slit 2 formed thereon to circumferentially divide the heat insulation sleeve 1 into two parts. This is to prevent the fixing roller 4 from shaking by its heat expansion and contraction. The reason the heat insulation sleeve 1 is interposed between the rolling bearing 5 of the fixing roller 4 and the small-diameter shaft portion 4a thereof is to prevent the temperature distribution along the axial direction of the fixing roller 4 from becoming non-uniform and prevent the bearing from deterioration due to a high temperature. The high temperature is released from the rolling bearing 5 disposed at each end of the fixing roller 4, when the fixing roller 4 is heated.

As shown in FIG. 9, the conventional heat insulation sleeve 1 is press-fitted on the small-diameter shaft portion 4a of the fixing roller 4. This is to prevent the creep generated in the rolling bearing 5 and the small-diameter shaft portion 4a from causing the creep of the heat insulation sleeve 1 and the small-diameter shaft portion 4a. When the creep occurs in the heat insulation sleeve 1 and the small-diameter shaft portion 4a, the small-diameter shaft portion 4a is worn by the heat insulation sleeve 1, with the result that the rotation accuracy of the fixing roller 4 deteriorates.

Because the heat insulation sleeve 1 is press-fitted on the small-diameter shaft portion 4a of the fixing roller 4, the creep of the bearing 5 is caused by the rolling bearing 5 and the heat insulation sleeve 1. An inner ring of the rolling bearing 5 is treated by hardening. Thus, even though the creep of the bearing is generated due to the creep of the rolling bearing 5 and the heat insulation sleeve 1, either of the rolling bearing 5 and the heat insulation sleeve 1 is not worn.

An electrophotographic apparatus such as a copying apparatus, a laser beam printer, and the like incorporating a fixing device are demanded to have functions of performing operations at a high speed, to be lightweight, to be compact, and have a good design. In addition, they are demanded to have a function of making low noises. In particular, the purpose of the use thereof is diversified and they are used increasingly at various places such as at home. Therefore, they are demanded to make low noises more and more.

The present inventors have made researches to develop an electrophotographic apparatus generating low noises. As a result, they have found that the fixing device thereof makes noises, which has not been considered much. Attention has been paid to develop parts, constituting the electrophotographic apparatus, which make no noises or low noises. It has been found that noises are made periodically or suddenly from the periphery of the fixing device. Therefore, it is important to reduce the generation of noise in the periphery of the fixing device to develop the electrophotographic apparatus that makes a low noise.

In recent years, the development of a color copying apparatus is progressing rapidly. Thus, the development of the electrophotographic apparatus is greatly demanded to have uniform and high temperature distribution. In this situation, a rolling bearing having a heat insulation sleeve installed thereon is used for a press roller.

However, in recent years, the power source of the electrophotographic apparatus or the like is turned off frequently at short intervals for energy saving. Thus, the power source for heating the fixing roller is turned on and off frequently at short intervals. In a rolling bearing device for use in such a fixing roller, the heat insulation sleeve is broken at the root of a flange thereof, which dislocates the fixing roller axially and thus deteriorates image quality.

SUMMARY OF THE INVENTION

The present invention has been made in view of the above-described situation. Thus, it is an object of the present invention to provide a heat insulation sleeve and a bearing device for a fixing roller capable of reducing the degree of generation of periodical or sudden noises that are generated in the periphery of a fixing device.

It is another object of the present invention to provide a heat insulation sleeve and a bearing device for a fixing roller preventing a flange of the heat insulation sleeve from being broken when the heat insulation sleeve and bearing device for a fixing roller are incorporated in an electrophotographic apparatus which is heated and cooled frequently at short intervals.

The heat insulation sleeve of the present invention is interposed between a fixing roller and a rolling bearing rotatably supporting the fixing roller at each end thereof The heat insulation sleeve has a slit dividing the heat insulation sleeve at one position in a circumferential direction of the heat insulation sleeve, and each end of the slit overlap each other in an axial direction of the heat insulation sleeve.

Further, the heat insulation sleeve has a flange and a projection. The flange is formed at one end of a cylindrical portion thereof and the projection at a peripheral end of the cylindrical portion.

The bearing device of the present invention for a fixing roller rotatably supporting the fixing roller comprises a heat insulation sleeve and a rolling beating. The heat insulation sleeve is interposed between a small-diameter portion of the fixing roller disposed at each end thereof and an inner ring of a rolling bearing, and is press-fitted on the inner ring of the rolling bearing.

Further, the heat insulation sleeve has a means for preventing the heat insulation sleeve from moving axially relative to the rolling bearing on a fit-on surface of the heat insulation sleeve that is fitted on a fit-on surface of the rolling bearing.

BRIEF DESCRIPTION OF THE DRAWINGS

FIG. 1A is a perspective view showing a heat insulation sleeve.

FIG. 1B is a side view showing the heat insulation sleeve.

FIG. 5 is a sectional view showing another bearing device for a fixing roller.

FIG. 6 is a sectional view showing still another heat insulation sleeve.

DETAILED DESCRIPTION OF THE PREFERRED EMBODIMENTS

As a result of investigations of the present inventors, it has been found that a resonant sound of a fixing roller makes noises that are generated periodically in the periphery of a fixing device. They have also found that a heat insulation sleeve causes the resonant sound.

Figure 7:
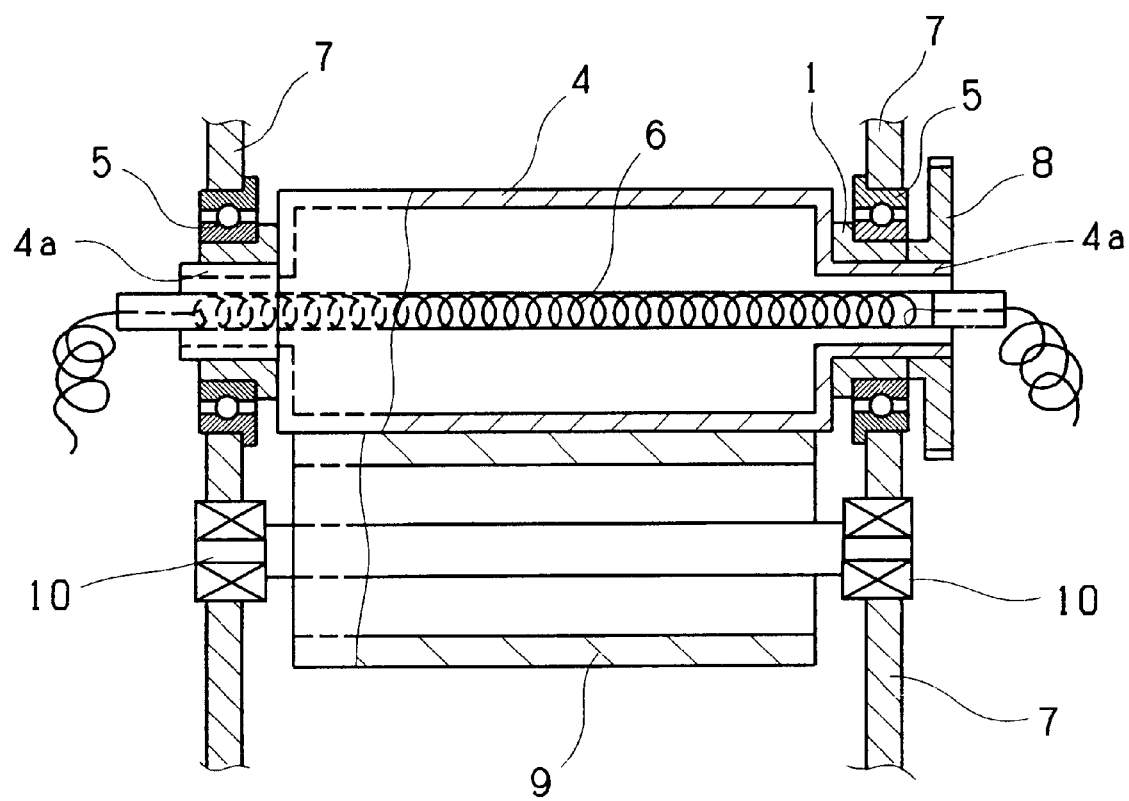
FIG. 7 shows an example of a heating-fixing device of an electrophotographic apparatus.
Figure 8:
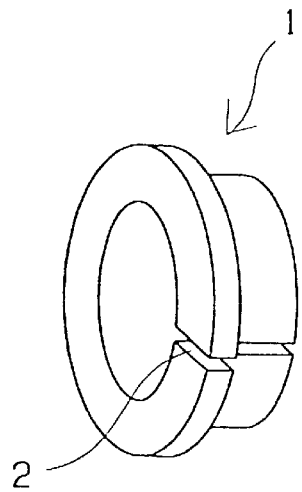
FIG. 8 is a perspective view showing a conventional heat insulation sleeve.

Referring to FIG. 7, the heat insulation sleeve 1 press-fitted on the fixing roller 4 and the rolling bearing 5 rotates, with the heat insulation sleeve 1 being supported by the rolling bearing 5. The fixing roller 4 is subjected to a force applied thereto by the press roller 9 in a direction perpendicular to the axis thereof. Thus, when the slit 2 comes to the force-applied portion during the rotation of the heat insulation sleeve 1, a slight difference in level is generated between the fit-on surface of the heat insulation sleeve 1 and that of the fixing roller 4 and between the fit-on surface of the heat insulation sleeve 1 and that of the rolling bearing 5. The present inventors have found that a slight vibration that occurs at this time is transmitted to the fixing roller, and the fixing roller resonates with the vibration to generate a periodical noise.

It has been also found that a noise that is generated suddenly is caused by an accidental sliding between the fixing roller and the heat insulation sleeve. The heat insulation sleeve is press-fitted on the fixing roller to prevent the bearing from creeping due to the creep that occurs on a fit-on surface of the fixing roller and that of the heat insulation sleeve. But it is impossible to completely prevent the creep of the bearing. An accidental sliding takes place on the fit-on surface of the fixing roller and that of the heat insulation sleeve due to the difference in the coefficient of thermal expansions thereof in some temperature region. The sudden noise is caused by a noise generated by the sliding at this time and resonant sounds generated by vibrations transmitted to the fixing roller.

The present invention has been made based on the knowledge. A slit-provided heat insulation sleeve has a construction that does not cause the generation of the difference in level between fit-on surfaces. Further, to prevent a sudden sliding from occurring, the heat insulation sleeve is press-fitted on an inner ring of a rolling bearing.

An embodiment of the heat insulation sleeve of the present invention will be described below with reference to FIGS. 1A and 1B.

The heat insulation sleeve 1 has a cylinder 1b having a flange 1a. The heat insulation sleeve 1 is cut off to form a slit thereon such that each end 3, 3 of the slit are parallel with each other and make an angle θ with the axis of the heat insulation sleeve 1 (direction A shown in FIG. 1B). In other words, in the embodiment, the confronting end surfaces of the slit of the sleeve 1 form the incline at the inclination θ with the axial direction of the heat insulation sleeve 1. Therefore, each end 3,3 are not parallel with the axial direction of the heat insulation sleeve 1. Thus, the difference in level is not generated between the fit-on surface of the heat insulation sleeve and that of the fixing roller and also between the fit-on surface of the heat insulation sleeve and that of the rolling bearing. Therefore, it is possible to prevent the generation of a noise. Further, it is possible to prevent the heat of the fixing roller from being released to the housing.

The slit 2 is so formed that each end 3, 3 have a gap therebetween in the circumferential direction of the heat insulation sleeve 1 such that the length of the gap is constant and that each end 3,3 make the angle θ with the axis of the heat insulation sleeve 1. Each end 3,3 are not required to have a particular configuration.

Referring to FIGS. 1A and 1B, the slit 2 has an angle θ=20–60 degrees with respect to the axial line B of the heat insulation sleeve. Therefore, the slit 2 prevents the difference in level between the fit-on surface of the heat insulation sleeve and that of the fixing roller and also between the fit-on surface of the heat insulation sleeve and that of the rolling bearing. Thus it is possible to prevent generation of the resonance of the fixing roller. The slit 2 forms a line closer to the axial line B of the heat insulation sleeve when the angle θ is less than 20 degrees. As a result, the difference in level is generated between the above-described fit-on surfaces. If the angle θ is larger than 60 degrees, the portion of the cylinder 1b between the flange 1a and the slit 2 is so thin there is a high possibility that the cylinder 1b is damaged.

The length of the slit 2 in the circumferential direction of the heat insulation sleeve is set less than ⅓ of the inner circumference of the heat insulation sleeve. That is, referring to FIG. 1B, the slit is formed in the range of ¾ of the inner diameter d of the flange 1a. It is preferable that the upper limit of the angle θ is 60 degrees.

The clearance of the slit is preferably in the range of 0.3–2.0 mm. By setting the clearance of the lit to this range, it is possible to prevent each end of the slit of the heat insulation sleeve from colliding with each other when the fixing roller is heated and expanded. Thus, it is possible to prevent the resonance of the fixing roller 4.

The slit of the heat insulation sleeve is so formed that each end of the slit overlap each other in the axial direction of the heat insulation sleeve. In addition, each end of slit overlap each other in the radial direction of the heat insulation sleeve to prevent static electricity from being discharged to the rolling bearing 5.

That is, toner remaining on the fixing roller 4 is removed therefrom by a voltage application means (not shown) that applies a high voltage having the same polarity as that of the remaining toner. The heat insulation sleeve 1 having a slit overlapping in the radial direction serves as an insulator interposed between the fixing roller 4 and the rolling bearing 5. Therefore, the shaft 4a of the fixing roller 4 and an inner ring 5a of the rolling bearing 5 do not confront each other directly, and the discharge distance of the slit 2 is long. As a result, a discharge does not take place from the fixing roller 4 to the rolling bearing 5, and the remaining toner can be removed at a high efficiency. Accordingly, it is unnecessary to provide a cleaning roller for removing the remaining toner. That is, the heat insulation sleeve 1 allows manufacture of a copying apparatus compact, light, inexpensive, and providing a high-quality image.

Modifications of each end of the slit of the heat insulation sleeve are shown in FIGS. 2A through 2D. In any of the modifications shown in FIGS. 2A through 2C, each end 3,3 are fitted on each other complementarity.

Figures 2A, 2B, 2C, 2D:
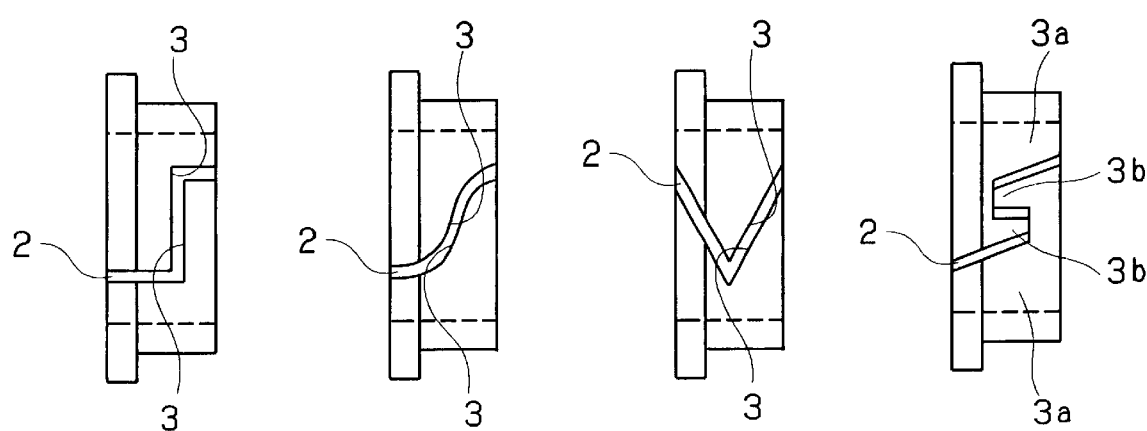
FIG. 2A is a modification (a) of the slit of the heat insulation sleeve.
FIG. 2B is a modification (b) of a slit of the heat insulation sleeve.
FIG. 2C is a modification (c) of a slit of the heat insulation sleeve.
FIG. 2D is a modification (d) of a slit of the heat insulation sleeve.

In the modification of FIG. 2A each end 3,3 consist of halved joints. In the modification of FIG. 2B, each end 3,3 consist of S-shaped halved joints. In these examples, the slit 2 is not parallel with the axis of the heat insulation sleeve.

In the modification of FIG. 2C, a front end surface of slit is formed as a projected surface having an acute angle, whereas the front end surface of the other miter 3 is formed as a concave surface on which the projected surface having an acute angle is fitted.

In the modification of FIG. 2D, each end 3,3 consist of halved joints, and an engaging projection 3b is formed on the front end of a confronting-side surface of each of projected pieces 3a and 3a such that each end 3,3 engage each other. The engagement of each end 3,3 prevents the slit 2 from being too long in the circumferential the direction of the heat insulation sleeve.

Each end may be formed on the flange by straight cut as in the case of the conventional art.

It is preferable that the heat insulation sleeve 1 is made of a molded product of synthetic resin. The heat insulation sleeve of the molded product of synthetic resin has a superior heat insulation, can be manufactured in lot-to-lot dimension uniformity, and inexpensive.

The molded product of synthetic resin is formed of a high-heat-resistant synthetic resin serving as a matrix and various reinforcing materials and additives contained in the matrix. That is, the molded product of synthetic resin is a resin composition reinforced with various fillers added to a heat-resistant synthetic resin such as polyamideimide resin, polyimide resin, polyether imide resin, polyether ketone resin, polyetherether ketone resin, polyphenylene sulfide resin, fluorine plastics, and phenol resin. It is necessary that the heat-resistant resin composition has a thermal deformation temperature of 220° C. or more. In addition to the synthetic resin, ceramics can be used.

It is also preferable that the heat insulation sleeve 1 is a molded product of synthetic resin having a flexural modulus of elasticity of 3000–25000 MPa. By setting the flexural modulus of elasticity to 3000–25000 MPa, the heat insulation sleeve can be integrated with the fixing roller easily and reliably without damaging it. Because the heat insulation sleeve contacts the fixing roller whose temperature rises up to about 200° C., it is preferable that the heat insulation sleeve is composed of the product of heat-resistant synthetic resin. Preferably, the molded product of synthetic resin is made of an electrically and thermally insulating material or an electrically conductive and thermally insulating material. It is preferable to use the electrically conductive and thermally insulating material for a fixing device having a discharge construction and use the electrically and thermally insulating material for a fixing device not having a discharge construction.

A bearing device, for a fixing roller, having a heat insulation sleeve press-fitted on an inner ring of a rolling bearing is described below with reference to FIG. 6.

The heat insulation sleeve 1 comprises the cylinder 1b having the flange 1a. The heat insulation sleeve 1 is divided by the slit 2. As in the case of the heat insulation sleeve shown in FIG. 1, the clearance of the slit 2 in the circumferential direction of the heat insulation sleeve is set to 0.3–2.0 mm. The slit is so formed on the heat insulation sleeve 1 that each end of the slit overlap each other in the axial direction or in the radial direction of the heat insulation sleeve, and the slit is formed to the axial direction of the heat insulation sleeve.

The rolling bearing 5 has a rolling member 5b interposed between an inner ring 5a and an outer ring 5c and a retainer. The rolling bearing 5 may not include the retainer.

In the bearing device for a fixing roller having the heat insulation sleeve press-fitted on the inner ring of the rolling bearing, the heat insulation sleeve and the rolling bearing are integrated with each other. Thus, a sudden sliding does not occur on the fit-on surface of the heat insulation sleeve and that the rolling bearing and thus generation of a sudden noise can be prevented.

It is possible to use a heat-resistant material superior having a preferable sliding-contact characteristic for the heat insulation sleeve to be used for the bearing device to be mounted on the fixing roller. As such a material, a synthetic resin composition and ceramics impregnated with a lubricant can be used. A molded product of synthetic resin having a friction coefficient of 0.29 or less to an aluminum alloy can be also used because it does not wear the shaft of the fixing roller.

Because in the bearing device to be mounted on the fixing roller, the heat insulation sleeve and the rolling bearing are integrated with each other, the fixing roller and the bearing device creep. As a result, the shaft of the fixing roller is worn. An experiment was conducted on the heating-fixing device, shown in FIG. 7, incorporating the rolling bearing integrated with the heat insulation sleeve having a friction coefficient of 0.29 or less, it was possible to prevent the shaft of the fixing roller from being worn despite the creep. The reason the friction coefficient of the heat insulation sleeve was set for the aluminum alloy was because the heat insulation sleeve contacts the member made of the aluminum alloy. That is, the shaft of the fixing roller is made of the aluminum alloy. If the friction coefficient of the heat insulation sleeve is more than 0.29, the creep of the fixing roller and that of the bearing device may cause the contact portion of the fixing roller or that of the heat insulation sleeve to be worn. The friction coefficient was measured by a thrust-type frictional wear test that will be described later. It is preferable that a low value is set as the lower limit value of the friction coefficient. The lower limit value of the friction coefficient is set to about 0.04.

The rolling bearing integrated with the heat insulation sleeve is constructed by press-fitting the heat insulation sleeve 1 on the inner ring 5a of the rolling bearing 5. The interference in the press fit is 0.2–0.4 mm in radius. That is, referring to FIG. 6, (outer diameter of cylinder 1b—inner diameter of inner ring 5a)/2=0.2–0.4 mm. If the interference in the press fit is less than 0.2 mm, it is impossible to integrate the bearing and the heat insulation sleeve with each other and thus cannot prevent the generation of a noise. If the interference in the press fit is more than 0.4 mm, a stress may cause the heat insulation sleeve to be damaged.

The heat insulation sleeve 1 can be press-fitted directly on the inner ring 5a of the rolling bearing. In addition, the heat insulation sleeve 1 can be press-fitted on the inner ring 5a by applying filler to the gap of a press fit portion 5e. A slight fit-on gap is generated between the fit-on surface of the rolling bearing and that of the heat insulation sleeve. By applying the filler to the fit-on gap, it is possible to obtain the rolling bearing device integrated with the heat insulation sleeve to a higher extent. Thus, it is possible to prevent the generation of the noise to a higher extent. As the filler, fluorine grease is preferable because it is heat-resistant, low in heat deterioration, and can be easily filled into the fit-on gap.

To fill the filler into the fit-on gap, after the fluorine grease is applied to the fit-on surface, the heat insulation sleeve is press-fitted on the rolling bearing.

The lubricating grease to be filled into the rolling bearing 5 contains powder of polytetrafluoroethylene resin. For example, the lubricating grease contains perfluoropolyether serving as base oil and fluorine grease of polytetrafluoroethylene resin serving as a thickening agent. As another example, the urea lubricating grease comprising ester oil serving as the base oil and urea as the thickening agent contains powder of polytetrafluoroethylene resin. Demnum L200 manufactured by Daikin industries Ltd. is commercially available as the fluorine grease. Grease J manufactured by NOK Kluber Inc. is commercially available as the grease containing the urea grease and the powder of polytetrafluoroethylene resin.

The grease containing the powder of polytetrafluoroethylene resin is preferable because it has a low extent of thermal degradation. The mixing amount of the tetrafluoroethylene resin is preferably 2–40 wt % to prevent the grease from deteriorating in lubricity even at a high temperature for a long-term use.

The present inventors have made researches to find the cause of the damage in the root of the flange of the heat insulation sleeve. They have found that it is attributed to the repeated expansion and contraction of the fixing roller. The state of the expansion and contraction is described below with reference to FIGS. 9 and 10.

Figure 9:
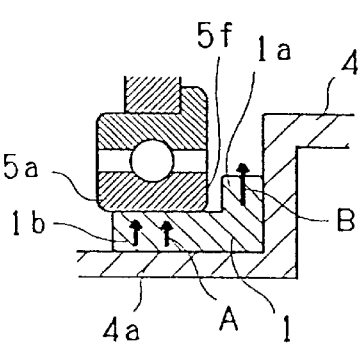
FIG. 9 shows a state in which a force is applied to the heat insulation sleeve.
Figure 10:
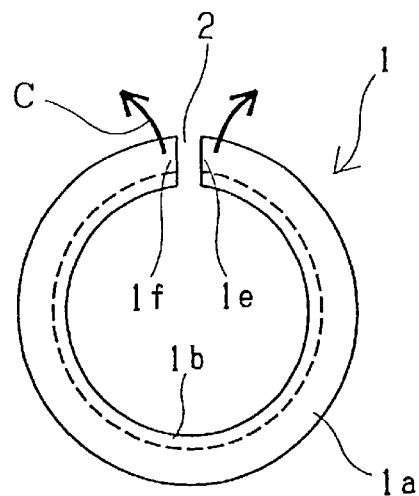
FIG. 10 shows an expansion direction of the heat insulation sleeve.

When the fixing roller 4 repeats the expansion and shrinkage by on/off of a heater, a gap may be generated between an end surface 5f of the rolling bearing and a flange 1a of the heat insulation sleeve 1, as shown in FIG. 9. This is because the rolling bearing disposed at each end of the fixing roller is fixed to the housing and because the fixing roller elongates due to thermal expansion in its axial direction. One rolling bearing disposed at each end of the fixing roller or two rolling bearings are fixed to the housing. Thus, even though the fixing roller elongates by the thermal expansion, the position of the rolling bearing is unchanged. The heat insulation sleeve is fitted on the fixing roller that elongates due to turn-on of the power source and is then restored to its original length because it is cooled due to turn-off of the power source. Thus, the heat insulation sleeve may move axially from its original position together with the fixing roller. This does not occur in an initial stage, but occurs when the heat insulation sleeve made of a molded product of resin is subjected to the heat of the fixing roller for a long time.

In this case, the heat insulation sleeve 1 repeats expansion and shrinkage for a long time, with the gap generated between the end surface 5f of the rolling bearing and the flange 1a of the heat insulation sleeve 1. As shown in FIG. 9, when the fixing roller 4 expands, the cylinder 1b of the heat insulation sleeve 1 is subjected to a force in a direction shown with an arrow A, with the cylinder 1b being pressed by the inner ring 5a of the rolling bearing 5 fixed to the housing. On the other hand, the flange 1a of the heat insulation sleeve 1 expands outward in the radial direction of the fixing roller 4 (in a direction shown with a narrow B of FIG. 9). In particular, end surfaces 1e and 1f of the slit 2 of the flange 1a expand thermally to a high extent in a direction shown with arrows C of FIG. 10. As a result of the expansion and shrinkage of the end surfaces 1e and 1f, the root of the flange 1a of the heat insulation sleeve 1 is cracked. Consequently, the flange 1a of the heat insulation sleeve 1 is broken from the end surface of the slit 2, which may separate the cylinder 1b and the flange 1a from each other.

Accordingly, if there is no gap generated between the end surface 5f of the inner ring of the rolling bearing 5 and the flange 1a of the heat insulation sleeve 1, the flange 1a is not broken even though the fixing roller repeats the expansion and shrinkage, because the heat insulation sleeve 1 is integral with the fixing roller 4.

The present invention has been made based on the above-described knowledge. The heat insulation sleeve has a means for preventing the heat insulation sleeve from moving axially relative to the inner ring of the rolling bearing. The root of the flange of the heat insulation sleeve does not break when the sleeve is used for the bearing device to be mounted on the fixing roller for use in an electrophotographic apparatus that is turned on and off frequently at short intervals.

An embodiment of the heat insulation sleeve having the means for preventing the heat insulation sleeve from moving axially relative to the rolling bearing is described below with reference to FIG. 3.

The heat insulation sleeve 1 comprises the cylinder 1b having the flange 1a. A slit is formed at a position of the heat insulation sleeve 1 in the circumferential direction thereof. A projection 1c is formed on one end, of the cylinder 1b, which is opposite to the flange-provided side of the heat insulation sleeve. After the heat insulation sleeve 1 is fitted on the inner ring of the rolling bearing, the projection 1c prevents the heat insulation sleeve 1 from moving axially relative to the rolling bearing. The length of the projection 1c in the radial direction of the cylinder 1b is 0.1–1.0 mm. If the length of the projection 1c is less than 0.1 mm, there is a possibility that the heat insulation sleeve 1 moves axially relative to the rolling bearing, whereas if the length of the projection 1c is larger than 1.0 mm, the heat insulation sleeve 1 is installed on the rolling bearing with difficulty.

A corner 1d between the flange 1a and the cylinder 1b has the same shape as that of the corner formed on the inner periphery of the inner ring of the rolling bearing. That is, the corner 1d is rounded, i.e., has an R-surface or a C-surface. The shape of the corner 1d improves the strength of the flange 1a in a thrust direction.

The shape of the corner 1d prevents the flange 1a of the heat insulation sleeve 1 from being cracked or broken when the flange 1a repeats expansion and shrinkage by the heating and cooling of the fixing roller.

The projection 1c may be formed entirely or partly on the peripheral surface of the heat insulation sleeve 1, provided that the heat insulation sleeve 1 is incapable of moving axially relative to the rolling bearing.

In the case of the heat insulation sleeve 1 having the projection 1c formed on its cylinder 1b, the slit maybe formed such that it makes a certain angle with the axis of the heat insulation sleeve or no angle therewith. Similarly to the slit formed on the heat insulation sleeve shown in FIG. 1, the clearance of the slit 2 in the circumferential direction of the flange is preferably 0.3 to 2.0 mm.

The heat insulation sleeve of the present invention is applicable to a fixing roller of a fixing portion that is subjected to a high temperature and is also applicable to a press roller. Because the heat insulation sleeve of the present invention can suppress periodical generation of noises, it can be used for portions, having a rotational shaft, such as a paper supply portion, a photosensitive portion, and a paper discharge portion of an image-forming apparatus.

The bearing device to be mounted on the fixing roller of the present invention is described below with reference to FIGS. 4A and 4B.

Figures 4A, 4B:
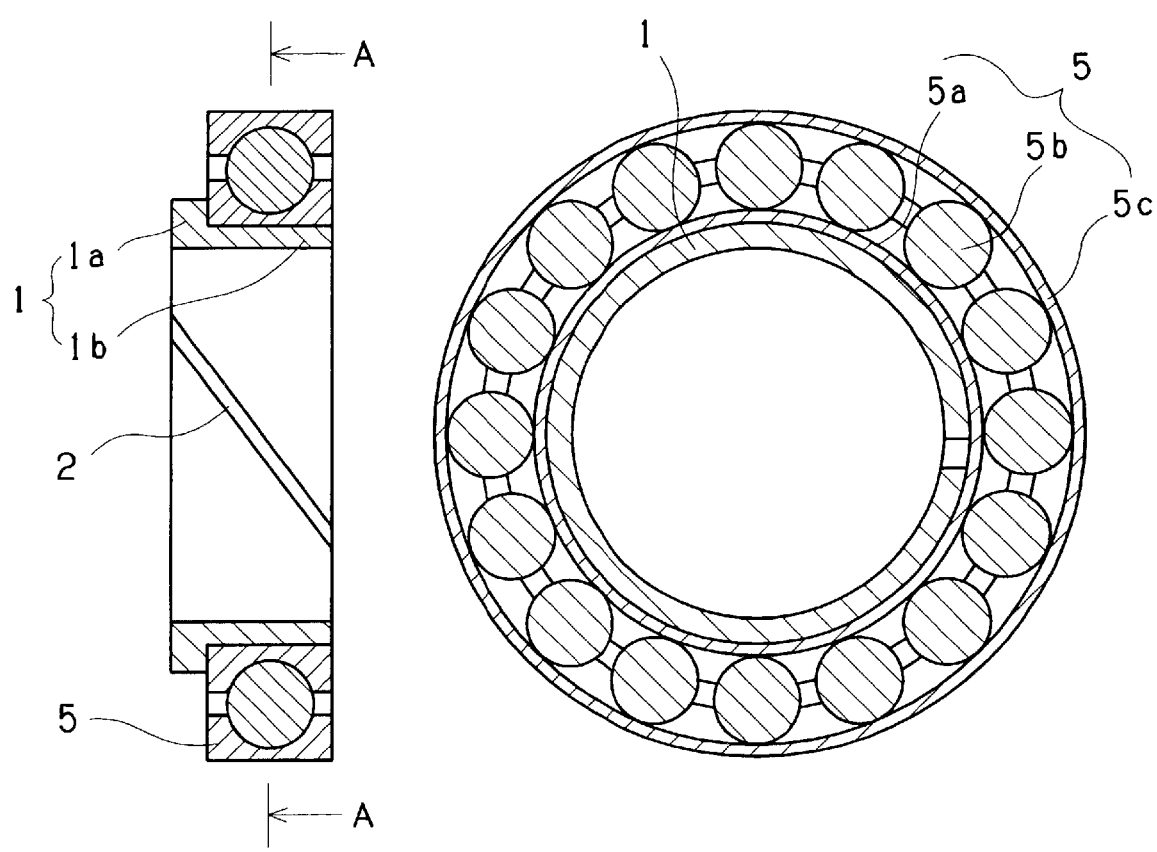
FIG. 4A is a sectional view showing a bearing device for a fixing roller.
FIG. 4B is a sectional view taken along a line A—A of FIG. 4A.

As shown in FIGS. 4A and 4B, in the bearing device for the fixing roller, the cylinder 1b of the heat insulation sleeve 1 is fitted on the inner ring 5a of the bearing 5.

The heat insulation sleeve 1 has a cylinder 1b provided with a flange 1a. The heat insulation sleeve 1 is cut off at a position thereof in its circumferential direction to form the slit 2 and each end of the slit 2 are formed.

The rolling bearing 5 has the rolling member 5b interposed between the inner ring 5a and the outer ring 5c and the retainer. The rolling bearing 5 may not include the retainer. The bearing device for the fixing roller supports the shaft of the fixing roller. In the rolling bearing 5, the peripheral surface of the outer ring 5c is formed as a stepped cylindrical surface, and a small-diameter portion of the peripheral surface of the outer ring 5c is fitted in a bearing-installing hole of a housing constituting a heating-fixing device.

The bearing device for the fixing roller using the heat insulation sleeve having the projection formed at one end thereof opposite to the flange-provided side thereof is described below with reference to FIG. 5.

The heat insulation sleeve 1 comprises the cylinder 1b having the flange 1a. A slit 2 is formed at a position of the heat insulation sleeve 1 in the circumferential direction thereof. A projection 1c is formed on one end, of the cylinder 1b, which is opposite to the flange-provided side of the heat insulation sleeve. After the heat insulation sleeve 1 is fitted on the inner ring 5a of the rolling bearing 5, the projection 1c prevents the heat insulation sleeve 1 from moving axially relative to the rolling bearing 5.

The projection 1c formed at one end, of the heat insulation sleeve 1, disposed opposite to the flange-provided side thereof is fitted on the corner 5d formed on the inner periphery of the inner ring 5a of the rolling bearing 5. When a force in the axial direction of the flange, namely, in a thrust direction acts on the heat insulation sleeve 1, the projection 1c of the heat insulation sleeve 1 is caught by the corner 5d formed on the inner periphery of the inner ring 5a of the rolling bearing 5. Thus, the heat insulation sleeve 1 cannot be unlocked from the corner 5d. As a result, the heat insulation sleeve 1 and the rolling bearing 5 are incapable of moving axially relative to each other.

The projection 1c allows the rolling bearing 5 and the heat insulation sleeve 1 to be integrated with each other and the rolling bearing 5 and the heat insulation sleeve 1 to be installed on the fixing roller easily. Further, the heat insulation sleeve 1 is sandwiched between the inner ring of the rolling bearing 5 and the fixing roller 4, when the rolling bearing 5 and the heat insulation sleeve 1 are installed on the fixing roller 4. Thus, when a force in the thrust direction acts on the heat insulation sleeve 1, the projection of the heat insulation sleeve 1 is locked to the corner 5d formed on the inner periphery of the inner ring 5a of the rolling bearing 5. Therefore, the rolling bearing 5 is not dislocated axially. As described above, the length of the projection 1c in the radial direction of the cylinder 1b is preferably 0.1–0.1 mm. The corner 1d between the flange 1a and the cylinder 1b has the same shape as that of the corner 5d formed on the inner periphery of the inner ring 5a of the rolling bearing 5. That is, the corner 1d is rounded, i.e., has an R-surface or a C-surface. The shape of the corner 1d improves the strength of the flange 1a in the thrust direction.

In the bearing device for the fixing roller, the shape of the corner 1d prevents the flange 1a of the heat insulation sleeve 1 from being cracked or broken when the flange 1a repeats expansion and shrinkage by the heating and cooling of the fixing roller.

EXAMPLE 1

A composition of polyamideimide resin (containing graphite at 15 wt %, flexural modulus of elasticity: 6000 MPa) was injection-molded to form a heat insulation sleeve, in the shape shown in FIGS. 1A and 1B, having a slit so formed that the slit makes an angle $\theta=45$ degrees with the axis B of the heat insulation sleeve. The inner diameter d of the heat insulation sleeve was 33 mm, the thickness t (axial length) of the heat insulation sleeve was 10 mm, and the clearance of the slit was 1.8 mm.

The prepared heat insulation sleeve was installed on a fixing device of a copying apparatus manufactured by Fuji Xerox Ltd. A test of feeding 5000 sheets of paper through the copying apparatus was conducted to examine whether noises were generated in the neighborhood of a fixing roller. The case where an noise was generated was denoted by x, and the case where an noise was not generated was denoted by ○ for evaluation. The result is shown in table 1.

EXAMPLE 2

A heat insulation sleeve prepared was the same as the heat insulation sleeve of the example 1 in all points, except that polyphenylene sulfide resin (containing carbon fiber at 15 wt %, flexural modulus of elasticity: 20000 MPa) was used instead of polyamideimide resin. The prepared heat insulation sleeve was evaluated in the same method as that of the example 1. The result is shown in table 1.

Comparison Example 1

A heat insulation sleeve prepared was the same as the heat insulation sleeve of the example 1 in all points, except that the slit of the heat insulation sleeve was perpendicular to the axial direction (axis B) of the heat insulation sleeve. The inner diameter d of the heat insulation sleeve was 33 mm, the thickness t (axial length) was 10 mm, and the clearance the slit was 1.8 mm. The prepared heat insulation sleeve was evaluated in the same method as that of the example 1. The result is shown in table 1.

Comparison Example 2

A heat insulation sleeve prepared was the same as the heat insulation sleeve of the comparison example 1 in all points, except that polyphenylene sulfide resin (containing carbon fiber at 30 wt %, flexural modulus of elasticity: 20000 MPa) was used. The prepared heat insulation sleeve was evaluated in the same method as that of the example 1. The result is shown in table 1.

TABLE 1

|  | Example | | Comparison Example | |
| --- | --- | --- | --- | --- |
|  | 1 | 2 | 1 | 2 |
| Resin composition | #1 | #2 | #1 | #2 |
| Periodical generation of noise | ○ | ○ | x | x |

Where #1 is composition of polyamide-imide resin, and #2 is composition of polyphenylene sulfide resin.

As indicated in table 1, in the examples 1 and 2, no noises were heard from the neighborhood of the fixing roller. On the other hand, in the comparison examples 1 and 2, noises were periodically heard from the neighborhood of the fixing roller.

The slit of the present invention is so formed that each end of the slit make an inclination with the axis of the heat insulation sleeve. Thus, the slit is not parallel with the axis of the heat insulation sleeve. Consequently it is possible to prevent the heat insulation sleeve from generating the difference in level between the above-described surfaces, the generation of the resonance of the fixing roller, and the generation of a noise.

As indicated in table 1, in the examples 1 and 2, the heat insulation sleeves are mold products of synthetic resin having the flexural modulus of elasticity between 3000–25000 MPa. Accordingly, the heat insulation sleeves maintain necessary strengths and did not cause the noise to be generated in the vicinity of the fixing roller.

EXAMPLE 3

Figure 3:
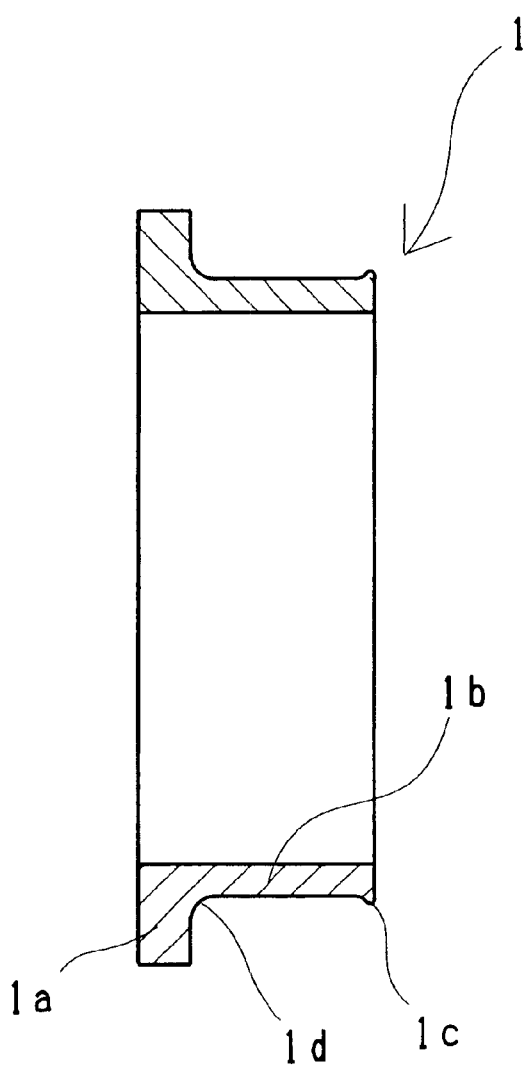
FIG. 3 is a sectional view showing another heat insulation sleeve.

A composition of polyamideimide resin (containing graphite at about 5 wt %, polytetrafluoroethylene resin at about 10 wt %) was injection-molded to form a heat insulation sleeve having the shape shown in FIG. 3. In consideration of the configuration of the corner formed on the inner periphery of the inner ring of a deep-groove ball bearing 6807, the height of the projection 1c in the radial direction of the heat insulation sleeve × the length in the axial direction thereof was set to 0.3 mm×0.3 mm. The corner between the flange and the cylinder was perpendicular.

The prepared heat insulation sleeve was fitted on the heat-treated deep-groove ball bearing 6807 (sealed iron plate into which fluorine grease was filled) to prepare a bearing device for a fixing roller. The bearing device for a fixing roller was installed on a color copying apparatus manufactured by Fuji Xerox Ltd., and an acceleration test of feeding sheets of paper through the color copying apparatus was conducted. In the test, the anti-driven side of the fixing roller was fixed to a thrust direction, while the thermal expansion direction of the fixing roller was set to a driving side. The main power source was turned on and off 150 times every 30 minutes.

The heat insulation sleeve was taken out from the color copying apparatus after the test terminated. The state of the flange was observed with a stereoscopic microscope having 20 magnifications. The case where crack was not recognized was denoted by ○ the case where crack was recognized was denoted by Δ and the case where the flange was broken due to crack was denoted by x for evaluation. The result is shown in table 2.

EXAMPLE 4

A heat insulation sleeve prepared was same as the heat insulation sleeve of the example 3 in all points, except that the corner between the flange and the cylinder was rounded (R: 0.2 mm). The same bearing device for a fixing roller as that of the example 3 was prepared. Evaluations were made in the same method as that of the example 3. The result is shown in table 2.

EXAMPLE 5

The heat insulation sleeve prepared was same as that of the example 4, except that polyphenylene sulfide resin (containing tetrafluoroethylene resin at about 20 wt %, Aramid fiber at about 10 wt %) was used. The same bearing device for a fixing roller as that of the example 4 was prepared. Evaluations were made in the same method as that of the example 3. The result is shown in table 2.

Comparison Example 3

The same resin composition as that of the example 3 was injection-molded to form a heat insulation sleeve in the shape shown in FIG. 3. The prepared heat insulation sleeve was fitted on the heat-treated deep-groove ball bearing 6807 (sealed iron plate into which fluorine grease was filled) to prepare a bearing device for a fixing roller. A gap of about 2 mm was formed between the flange and the inner periphery of the inner ring of the bearing. In this manner, a bearing device for a fixing roller was prepared. Evaluations were made in the same method as that of the example 3. The result is shown in table 2.

Comparison Example 4

A composition of polyphenylene sulfide resin (containing polytetrafluoroethylene resin at about 20 wt %, Aramid fiber at about 10 wt %) was injection-molded to form the same heat insulation sleeve as that of the comparison example 3. The prepared heat insulation sleeve was fitted on the heat-treated deep-groove ball bearing 6807 (sealed iron plate into which fluorine grease was filled) to prepare a bearing device for a fixing roller. A gap was not formed between the flange and the inner periphery of the inner ring of the bearing. In this manner, a bearing device for a fixing roller was prepared. Evaluations were made in the same method as that of the example 3. The result is shown in table 2.

TABLE 2

|  | Example | | | Comparision Example | |
|---|---|---|---|---|---|
|  | 3 | 4 | 5 | 3 | 4 |
| State of flange | ○ | ○ | ○ | x | Δ |

As indicated in table 2, in the examples 3–5, the stereoscopic microscope having 20 magnifications observed no crack.

On the other hand, in the comparison example 3 in which the gap was formed between the bearing and the heat insulation sleeve, the flange was broken and hung from the fixing roller. In the comparison example 4 in which the corner between the flange and the cylinder was perpendicular, the corner of the flange was cracked circumferentially from the slit in a length of about 5 mm.

The heat insulation sleeve of the present invention has the projection formed on one end, of the cylinder, disposed opposite to the flange-provided side of the heat insulation sleeve so that the projection prevents the rolling bearing from moving axially relative to the heat insulation sleeve. Thus, the flange of the heat insulation sleeve can be prevented from being broken or cracked.

The bearing device for a fixing roller of the present invention has the means for preventing the heat insulation sleeve from moving axially relative to the rolling bearing. Accordingly, even when the power source of the fixing roller is turned on and off frequently at short intervals, the rolling bearing and the heat insulation sleeve can be prevented from being separated from each other, and the flange of the heat insulation sleeve can be prevented from being broken or cracked.

The projection serving as the means for preventing the heat insulation sleeve and the rolling bearing from moving axially relative to each other has a height of 0.1–1.0 mm in the radial direction of the heat insulation sleeve. Therefore, injection molding of the heat insulation sleeve can be accomplished easily. Further, the projection allows the heat insulation sleeve to be fitted on the rolling bearing easily.

Further, the corner between the flange of the heat insulation sleeve and the cylinder was rounded as the R-surface or the C-surface. Thus, the shape of the corner improves the strength of the flange. Furthermore, because the rolling bearing and the heat insulation sleeve can be integrated, they can be handled easily and installed on the fixing roller easily. Thus, the shape of the corner allows the manufacturing cost to be reduced.

EXAMPLE 6

A composition of polyamideimide resin (containing graphite at about 5 wt %, polytetrafluoroethylene resin at about 10 wt %, and friction coefficient: 0.27) was injection-molded to form a heat insulation sleeve having the shape shown in FIG. 6. A thrust-type frictional wear test was conducted on a test piece having a predetermined shape to measure the friction coefficient of the heat insulation sleeve. As the test conditions the atmospheric temperature was set to 200° C., the load was set to 35N, and the peripheral speed was set to 2.8 m/min. The friction coefficient of the heat insulation sleeve was measured by subjecting it to friction with an aluminum alloy (A5056).

The prepared heat insulation sleeve was press-fitted on a deep-groove ball bearing 6803 to obtain a bearing device for a fixing roller shown in FIG. 6. Fluorine grease was filled into the deep-groove ball bearing 6803. The interference between the rolling bearing and the heat insulation sleeve was 0.2 mm in radius. The clearance of the slit in the circumferential direction of the heat insulation sleeve after the heat insulation sleeve was fitted on the deep-groove ball bearing 6803 was 1.8 mm.

The prepared bearing device was installed on a fixing device of a copying apparatus manufactured by Fuji Xerox Ltd. A test of feeding 5000 sheets of paper through the copying apparatus was conducted to examine whether noises were generated in the neighborhood of a fixing roller. The case where an noise was generated was denoted by x, and the case where an noise was not generated was denoted by ○ for evaluation. The result is shown in table 3.

EXAMPLE 7

A bearing device was prepared by a method similar to that of the example 6, except that the fluorine grease was applied to the fit-on surface of the rolling bearing and that of the heat insulation sleeve. Evaluations were made in a method similar to that of the sixth example. Table 3 shows the result.

EXAMPLE 8

A bearing device was prepared in a method similar to that of the example 6, except that polyphenylene sulfide resin (containing polytetrafluoroethylene resin at about 20 wt %, Aramid fiber at about 10 wt %, friction coefficient: 0.16) was used instead of polyamideimide resin. Evaluations were made in a method similar to that of the example 6. Table 3 shows the result.

EXAMPLE 9

A bearing device was prepared in a method similar to that of the example 6, except that the interference was 0.4 mm in radius. Evaluations were made in a method similar to that of the example 6. Table 3 shows the result.

Comparison Example 5

A bearing device was prepared in a method similar to that of the example 6, except that the interference was 0 mm in radius. Evaluations were made in a method similar to that of the example 6. Table 3 shows the result.

Comparison Example 6

A bearing device was prepared in a method similar to that of the example 6, except that the interference was 0 mm in radius and that the fluorine grease was applied to the fit-on surface of the rolling bearing and that of the heat insulation sleeve. Evaluations were made in a method similar to that of the example 6. Table 3 shows the result.

TABLE 3

|  | Example | | | | Comparision Example | |
|---|---|---|---|---|---|---|
|  | 6 | 7 | 8 | 9 | 5 | 6 |
| Interference mm | 0.2 | 0.2 | 0.2 | 0.4 | 0 | 0 |
| Slit length mm | 1.8 | 1.8 | 1.8 | 1.8 | 1.8 | 1.8 |
| Friction coefficient | 0.27 | 0.27 | 0.16 | 0.16 | 0.27 | 0.27 |

TABLE 3-continued

|  | Example | | | | Comparision Example | |
| --- | --- | --- | --- | --- | --- | --- |
|  | 6 | 7 | 8 | 9 | 5 | 6 |
| Filler to fit-on surface | Not | Applied | Not | Not | Not | Applied |
| Noise | ○ | ○ | ○ | ○ | x | x |

As indicated in table 3, in the examples 6–9, no noises were heard periodically or suddenly from the neighborhood of the fixing roller. The fixing roll of the example 7 in which fluorine grease was applied to the fit-on surface of the rolling bearing and that of the heat insulation sleeve made less noise than that of the example 6, the example 8, and the example 9.

On the other hand, in the comparison examples 5–6, noises were heard from the neighborhood of the fixing roller.

In the bearing device for the fixing roller, the heat insulation sleeve having the slit dividing the heat insulation sleeve at one position in the circumferential direction thereof and composed of the resin material is integrated with the rolling bearing by press-fitting the heat insulation sleeve on the inner ring of the rolling bearing. Therefore, it is possible to prevent the resonance of the fixing roller and a sudden noise from being generated in the vicinity of the fixing roller.

What is claimed is:

1. A heat insulation sleeve interposing between a fixing roller and a rolling bearing rotatably supporting said fixing roller at each end thereof, comprising a sleeve having a slit,
   wherein said slit divides said heat insulation sleeve at one position in a circumferential direction of said heat insulation sleeve; and each end of said slit overlap each other in an axial direction of said heat insulation sleeve,
   wherein said heat insulation sleeve comprises a molded product of synthetic resin having a flexural modulus of elasticity in a range of 3000 to 25000 MPa.

2. A heat insulation sleeve according to claim 1, wherein said slit has an angle of 20–60 degrees with respect to a central line of said axial direction of said heat insulation sleeve.

3. A heat insulation sleeve according to claim 1, wherein a length of said slit in a circumferential direction of said heat insulation sleeve is set smaller than 1/3 of an inner circumference of said heat insulation sleeve.

4. A heat insulation sleeve interposing between a fixing roller and a rolling bearing rotatably supporting said fixing roller at each end thereof, comprising a flange and a projection,
   wherein said flange formed at one end of a cylindrical portion thereof and said projection formed at a peripheral end of said cylindrical portion.

5. A heat insulation sleeve according to claim 4, wherein said projection formed at said peripheral end of said cylindrical portion has a length of 0.1–1.0 mm in a radial direction of said heat insulation sleeve.

6. A heat insulation sleeve according to claim 4,
   wherein a corner between said flange of said heat insulation sleeve and said cylindrical portion is rounded as the same shape of the corner formed on the inner periphery of a inner ring of the rolling bearing.

7. A bearing device for a fixing roller comprising a heat insulation sleeve and a rolling bearing,
   wherein said heat insulation sleeve is interposed between a small-diameter portion of said fixing roller disposed at each end thereof and an inner ring of said rolling bearing,
   wherein said heat insulation sleeve is press-fitted on said inner ring of said rolling bearing,
   wherein said heat insulation sleeve comprises a molded product of synthetic resin having a friction coefficient of not more than 0.29 to an aluminum alloy.

8. A bearing device for a fixing roller according to claim 7,
   wherein said heat insulation sleeve is press-fitted on said inner ring of said rolling bearing by setting an interference between said inner ring of said rolling bearing and said heat insulation sleeve to 0.1–0.4 mm in radius.

9. A bearing device for a fixing roller according to claim 7, wherein said heat insulation sleeve has a slit dividing said heat insulation sleeve at one position in a circumferential direction of said heat insulation sleeve; and each end of said slit overlap each other in an axial direction of said heat insulation sleeve.

10. A bearing device for a fixing roller comprising a heat insulation sleeve and a rolling bearing,
    wherein said heat insulation sleeve is interposed between a small-diameter portion of said fixing roller disposed at each end thereof and an inner ring of said rolling bearing,
    wherein said heat insulation sleeve is press-fitted on said inner ring of said rolling bearing,
    wherein said heat insulation sleeve has a means for preventing said heat insulation sleeve from moving axially relative to said rolling bearing on a fit-on surface of said heat insulation sleeve.

11. A bearing device for a fixing roller rotatably supporting said fixing roller comprising a heat insulation sleeve and a rolling bearing,
    wherein said heat insulation sleeve interposed between a small-diameter portion of said fixing roller disposed at both ends therefor and an inner ring of said rolling bearing,
    wherein said heat insulation sleeve has a means for preventing said heat insulation sleeve from moving axially relative to said rolling bearing on a fit-on surface of said heat insulation sleeve.

12. A bearing device for a fixing roller according to claim 11, wherein a corner between said flange of said heat insulation sleeve and said cylindrical portion is rounded as the same shape of the corner formed on the inner periphery of an inner ring of the roller bearing.

* * * * *